United States Patent
Zhong et al.

(10) Patent No.: US 12,246,458 B2
(45) Date of Patent: Mar. 11, 2025

(54) ROBOT SYSTEM

(71) Applicant: FANUC CORPORATION, Yamanashi (JP)

(72) Inventors: Tingting Zhong, Yamanashi (JP); Yuusuke Oota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 285 days.

(21) Appl. No.: 17/794,438

(22) PCT Filed: Feb. 15, 2021

(86) PCT No.: PCT/JP2021/005391
§ 371 (c)(1),
(2) Date: Jul. 21, 2022

(87) PCT Pub. No.: WO2021/166818
PCT Pub. Date: Aug. 26, 2021

(65) Prior Publication Data
US 2023/0072284 A1 Mar. 9, 2023

(30) Foreign Application Priority Data
Feb. 20, 2020 (JP) ................................ 2020-027184

(51) Int. Cl.
*B25J 9/16* (2006.01)
(52) U.S. Cl.
CPC .................................. *B25J 9/1697* (2013.01)
(58) Field of Classification Search
CPC ............... B25J 9/1697; G05B 19/4182; G05B 2219/39102
See application file for complete search history.

(56) References Cited

U.S. PATENT DOCUMENTS 4,839,726 A * 6/1989 Balopole ................. H04N 5/20
348/625
5,521,843 A * 5/1996 Hashima .............. G06V 10/507
382/103
(Continued)

FOREIGN PATENT DOCUMENTS

EP 2497611 A2 9/2012
EP 3020517 A2 5/2016
(Continued)

OTHER PUBLICATIONS

JP-2013258542-A translation (Year: 2013).*
(Continued)

*Primary Examiner* — Kyle T Johnson
(74) *Attorney, Agent, or Firm* — Maier & Maier, PLLC

(57) ABSTRACT

A robot system including a robot, an image capturing device, and a controller. The controller and the image capturing device have clocks, the controller conducts transmission of, to the image capturing device, an image-capturing instruction including a predetermined waiting time, the predetermined waiting time being a time between a time of the transmission and an image capturing time, or a required time obtained by subtracting, from the waiting time, a difference time between the time of the transmission and receiving time of the image-capturing instruction, the image capturing device conducts image capturing of an image of the workpiece at time when the required time elapses from the receiving time and transmits image data, and the controller controls the robot based on position information of the robot at time when the waiting time elapses from the time of the transmission and the image data.

3 Claims, 5 Drawing Sheets

(56) References Cited

U.S. PATENT DOCUMENTS

| | | | |
|---|---|---|---|
| 6,282,462 B1* | 8/2001 | Hopkins | G06T 1/0007 |
| | | | 348/323 |
| 10,296,602 B1 | 5/2019 | Cooper et al. | |
| 2007/0007924 A1* | 1/2007 | Nishihara | G05B 19/4182 |
| | | | 318/560 |
| 2010/0094453 A1 | 4/2010 | Nishihara et al. | |
| 2011/0218675 A1* | 9/2011 | Ban | B25J 9/1697 |
| | | | 901/47 |
| 2012/0209430 A1* | 8/2012 | Igarashi | B25J 9/1697 |
| | | | 901/30 |
| 2012/0229620 A1* | 9/2012 | Ikeda | B25J 9/1692 |
| | | | 348/94 |
| 2014/0074291 A1* | 3/2014 | Emoto | B25J 9/1697 |
| | | | 700/258 |
| 2014/0081456 A1* | 3/2014 | Schaller | G05B 19/4086 |
| | | | 700/251 |
| 2016/0151916 A1* | 6/2016 | Kanno | B25J 9/1697 |
| | | | 700/228 |
| 2019/0013926 A1* | 1/2019 | Sakaue | H04L 12/403 |
| 2019/0275678 A1 | 9/2019 | Takeuchi | |
| 2020/0225642 A1* | 7/2020 | Gortz | G05B 19/19 |
| 2020/0282575 A1* | 9/2020 | Haeusler | B25J 9/1612 |
| 2022/0161437 A1* | 5/2022 | Sasaki | G05D 1/0038 |
| 2022/0182539 A1* | 6/2022 | Mimura | H04N 7/188 |
| 2022/0199448 A1* | 6/2022 | Takahashi | G06T 7/0004 |
| 2023/0072284 A1* | 3/2023 | Zhong | B25J 9/1697 |

FOREIGN PATENT DOCUMENTS

| | | |
|---|---|---|
| GB | 2428035 A | 1/2007 |
| JP | H09-300264 A | 11/1997 |
| JP | H10-105217 A | 4/1998 |
| JP | 2001-212777 A | 8/2001 |
| JP | 2007-015055 A | 1/2007 |
| JP | 2011-201007 A | 10/2011 |
| JP | 2012-166314 A | 9/2012 |
| JP | 2012-187651 A | 10/2012 |
| JP | 2013258542 A * | 12/2013 |
| JP | 2017011573 A * | 1/2017 |
| JP | 2018-083284 A | 5/2018 |
| WO | 2018/043525 A1 | 3/2018 |

OTHER PUBLICATIONS

JP-2017011573-A translation (Year: 2017).*
A_timing_model_for_vision-based_control_of_industrial_robot_manipulators (Year: 2004).*
International Search Report mailed May 11, 2021, in corresponding to International Application No. PCT/JP2021/005391; 7 pages (with English Translation).

* cited by examiner

ROBOT SYSTEM

CROSS-REFERENCE TO RELATED APPLICATION(S)

This application is based upon and claims the benefit of priority from Japanese Patent Application No. 2020-027184 filed on Feb. 20, 2020, the entire contents of which are incorporated herein by reference.

The present disclosure relates to a robot system.

BACKGROUND

For example, Japanese Unexamined Patent Application, Publication No. 2001-212777 discloses a robot control device that controls a robot on the basis of image data of a workpiece obtained by a CCD camera fixed to the end of the arm of the robot and position information of the robot at the time when an image of the workpiece was captured.

In this robot control device, the control device obtains the position information of the robot at the time when the control device takes in the image data obtained by the CCD camera.

SUMMARY

An aspect of the present disclosure is a robot system including: a robot that performs an operation on a workpiece; an image capturing device that captures an image of the workpiece while the workpiece is being moved relative to the image capturing device; and a controller that controls the image capturing device and the robot. The controller and the image capturing device have clocks whose zero points are the same or shifted from each other by a known amount, the controller is configured to conduct transmission of, to the image capturing device, an image-capturing instruction including a predetermined waiting time, the predetermined waiting time being a time between a time of the transmission of the image-capturing instruction and an image capturing time, or a required time obtained by subtracting, from the waiting time, a difference time between the time of the transmission of the image-capturing instruction and receiving time of the image-capturing instruction, the image capturing device is configured to conduct image capturing of an image of the workpiece at time when the required time elapses from the receiving time, and transmits, to the controller, image data obtained by the image capturing, and the controller is configured to obtain position information of the robot at time when the waiting time elapses from the time of the transmission and configured to control the robot based on the position information and the image data transmitted from the image capturing device.

DETAILED DESCRIPTION OF THE EMBODIMENTS

In reality in this technical field, there is a time lag between the time when the camera captures an image and the time when the control device takes in the image data due to a delay in communication of the image data. Hence, when image capturing is performed while a robot is operated, the position information of the robot at the time when the image data is obtained and the position information of the robot at the time when the control device obtains the image data are different.

Accordingly, there is a demand for accurately obtaining the position information of the robot at the time when the camera captures an image, even with a communication delay.

A robot system 1 according to an embodiment of the present disclosure will be described below with reference to the drawings.

Figure 1:
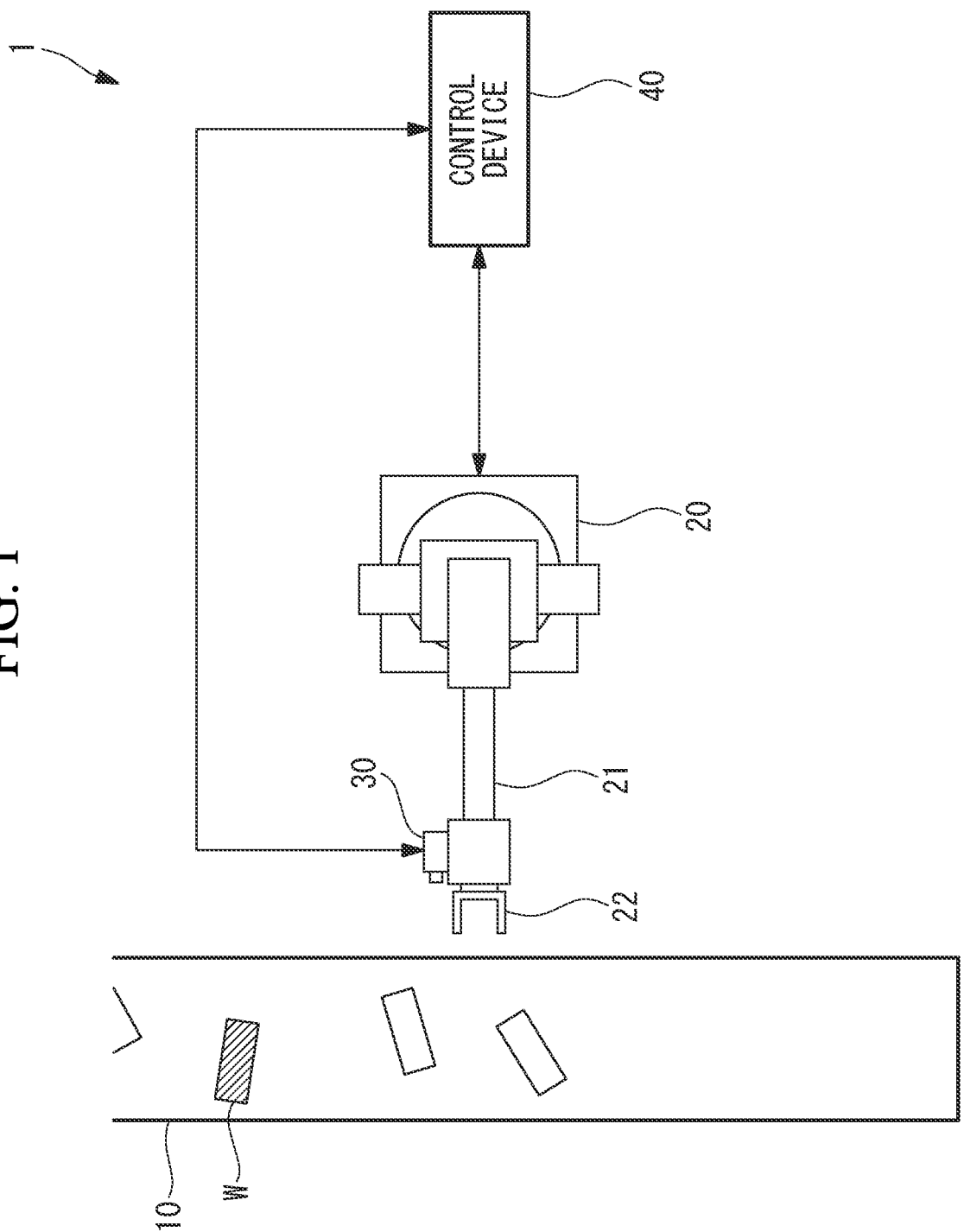
FIG. 1 shows an overall configuration of a robot system according to an embodiment of the present invention.

As shown in FIG. 1, the robot system 1 according to this embodiment includes a robot 20 that performs an operation on workpieces W, an image capturing device 30 fixed to the distal end of an arm 21 of the robot 20, and a control device 40. In FIG. 1, reference sign 10 denotes a transport device, such as a conveyor, for transporting the workpieces W.

In the example shown in FIG. 1, the robot 20 is a vertical six-axis articulated-type robot and has, at the distal end of the wrist provided at the distal end of the arm 21, a hand 22 capable of gripping a workpiece W.

The control device 40 includes at least one processor (not shown) including hardware and controls the robot 20 and the image capturing device 30 according to multiple commands in an operation program, by executing the operation program taught in advance.

Figure 2:
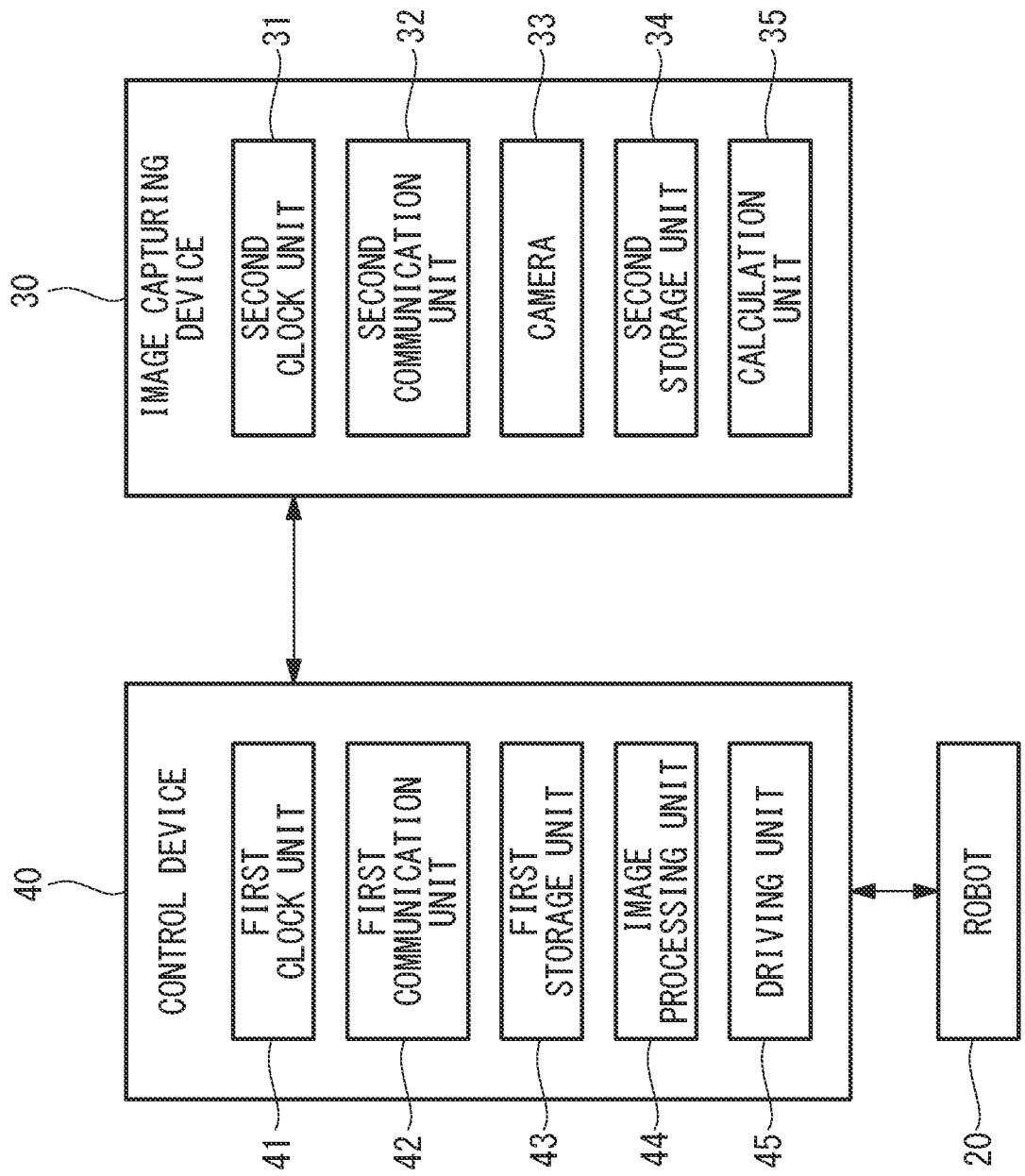
FIG. 2 is a block diagram showing an image capturing device and a control device provided in the robot system in FIG. 1.
Figure 3:
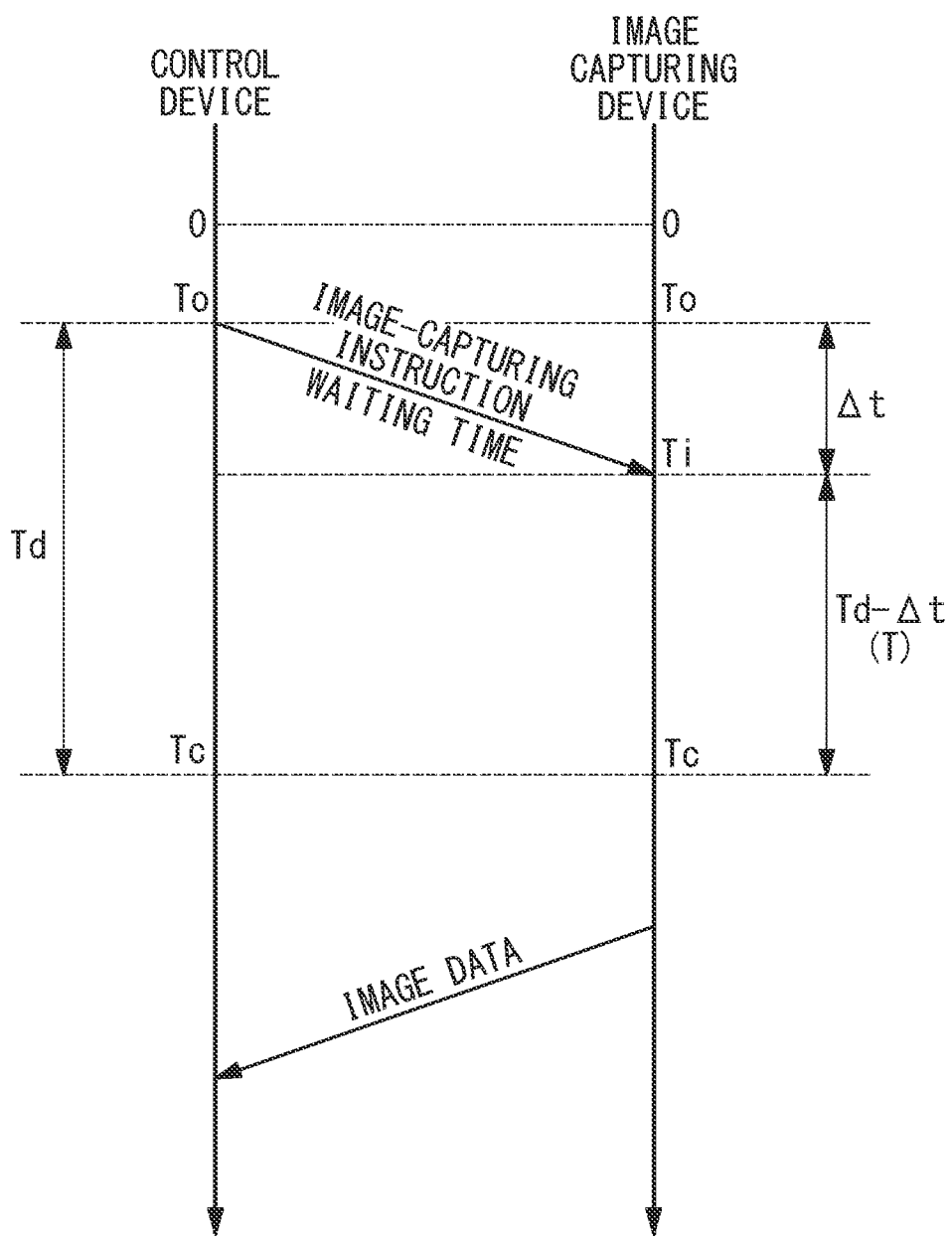
FIG. 3 shows an example data transfer timing between the image capturing device and the control device provided in the robot system in FIG. 1.

As shown in FIGS. 2 and 3, the control device 40 includes a first clock unit (clock) 41 that clocks the time in the control device 40, and a first communication unit 42 that transmits an image-capturing instruction to the image capturing device 30 and receives image data from the image capturing device 30.

The control device 40 also includes a first storage unit 43 that stores angle information (position information), detected by encoders (not shown), of joint axes of the robot 20.

The control device 40 also includes an image processing unit 44 that processes the image data received from the image capturing device 30 to extract the workpiece W in the image and calculates the position thereof, and a driving unit 45 that controls the robot 20 on the basis of the calculated position of the workpiece W and the angle information stored in the first storage unit 43.

As shown in FIGS. 2 and 3, the image capturing device 30 includes a second clock unit (clock) 31 that clocks the time in the image capturing device 30, and a second communication unit 32. The second communication unit 32 receives the image-capturing instruction transmitted from the control device 40 and transmits image data of the workpiece W, obtained by image capturing, to the control device 40.

The image capturing device 30 also includes a camera 33 that captures an image of the workpiece W according to the image-capturing instruction from the control device 40, and a second storage unit 34 that stores a preset difference time Δt needed to transfer the image-capturing instruction.

Herein, the difference time Δt is determined on the basis of the result of measurement and evaluation of the difference time Δt that actually occurred in transferring the image-capturing instruction in an experiment performed in advance.

The image capturing device 30 also includes a calculation unit 35 that subtracts the difference time Δt stored in the second storage unit 34 from a predetermined waiting time Td included in the image-capturing instruction from the control device 40.

The first clock unit 41 in the control device 40 and the second clock unit 31 in the image capturing device 30 are synchronized so as to have the same zero points.

The first clock unit 41 and the second clock unit 31 are synchronized by, for example, a time synchronization protocol (PTP) defined by IEEE1588.

In this embodiment, the control device 40 transmits, to the image capturing device 30, an image-capturing instruction including the predetermined waiting time Td, which is the time from the transmission time To of the image-capturing instruction to the image capturing time Tc. The image-capturing instruction transmitted from the control device 40 is received by the second communication unit 32. The calculation unit 35 calculates the required time T, which is the time from the receiving time Ti of the image-capturing instruction to the image capturing time Tc, on the basis of the waiting time Td included in the received image-capturing instruction and the difference time Δt stored in the second storage unit 34.

$$T=Td-\Delta t$$

Then, the image capturing device 30 captures an image of the workpiece W at the time when the required time T has elapsed from the time Ti, when the second communication unit 32 received the image-capturing instruction from the control device 40.

The image data of the workpiece W obtained by image capturing is transmitted to the control device 40 by the second communication unit 32.

The operation of the thus-configured robot system 1 according to this embodiment will be described below.

First, the second clock unit 31 that clocks the time in the image capturing device 30 and the first clock unit 41 that clocks the time in the control device 40 are synchronized. This equalizes the zero point of the second clock unit 31 in the image capturing device 30 and the zero point of the first clock unit 41 in the control device 40.

In other words, the image capturing device 30 and the control device 40 are controlled on the basis of the synchronized time base.

Next, as shown in FIGS. 2 and 3, the first communication unit 42 in the control device 40 transmits, at the transmission time To, an image-capturing instruction to the image capturing device 30 to capture an image of the workpiece W.

Furthermore, the control device 40 stores, in the first storage unit 43, the angle information of the joint axes detected by the encoders of the robot 20 at the time Tc, which is the time after the waiting time Td has elapsed from the transmission time To, clocked by the first clock unit 41.

Meanwhile, in the image capturing device 30, the second communication unit 32 receives the image-capturing instruction transmitted from the control device 40 at time Ti, which is the time delayed by the difference time Δt from the transmission time To.

Furthermore, the calculation unit 35 calculates the required time T by subtracting the difference time Δt, preliminarily stored in the second storage unit 34, from the waiting time Td included in the image-capturing instruction.

Then, the camera 33 captures an image of the workpiece W at the time Tc, which is the time after the required time T has elapsed from the receiving time Ti of the image-capturing instruction, clocked by the second clock unit 31.

Then, the image data of the workpiece W obtained by the camera 33 is transmitted to the control device 40 by the second communication unit 32.

As a result, while the receiving time Ti of the image-capturing instruction is delayed by the difference time Δt from the transmission time To, the image capturing device 30 performs image capturing after the required time T, which is shorter than the waiting time Td by the difference time Δt, has elapsed from the receipt of the image-capturing instruction.

More specifically, even with the difference time Δt between transmission and receiving of the image-capturing instruction, the image capturing device 30 accurately performs image capturing of the workpiece W at the time Tc, which is the time after the waiting time Td has elapsed from the transmission time To of the image-capturing instruction.

When image data of the workpiece W is transmitted to the control device 40, the image processing unit 44 processes the image data of the workpiece W to extract the workpiece W in the image and detects the position and orientation of the workpiece W.

Then, the driving unit 45 calculates the angles of the joint axes of the robot 20 for gripping the workpiece W with the hand 22 on the basis of the position information of the robot 20 at the time Tc and the information of the workpiece W photographed at the time Tc.

Thus, it is possible to make the robot 20 perform an accurate operation on the workpiece W.

Although the control device 40 adds the waiting time Td to the image-capturing instruction in this embodiment, instead, the control device 40 may add the required time T, obtained by subtracting the difference time Δt between the receiving time Ti of the image-capturing instruction and the transmission time To from the waiting time Td, to the image-capturing instruction.

In that case, the difference time Δt is stored in the first storage unit 43 in the control device 40, together with the waiting time Td. Furthermore, the control device 40 calculates the required time T by subtracting the difference time Δt from the waiting time Td. The calculated required time T is added to the image-capturing instruction and is transmitted to the image capturing device 30.

In the image capturing device 30, the camera 33 captures an image of the workpiece W at the time Tc, which is the time after the required time T included in the image-capturing instruction has elapsed from the receiving time Ti of the image-capturing instruction.

More specifically, in this case, because the image capturing device 30 does not need to calculate the required time T, the second storage unit 34 for storing the difference time Δt can be omitted, which further simplifies the structure of the image capturing device 30.

Furthermore, in this embodiment, although the control device 40 transmits the image-capturing instruction including the waiting time Td alone to the image capturing device 30, instead, it is possible to add the transmission time To to the image-capturing instruction to be transmitted, in addition to the waiting time Td. In that case, the difference time Δt does not need to be stored in the second storage unit 34.

Figure 4:
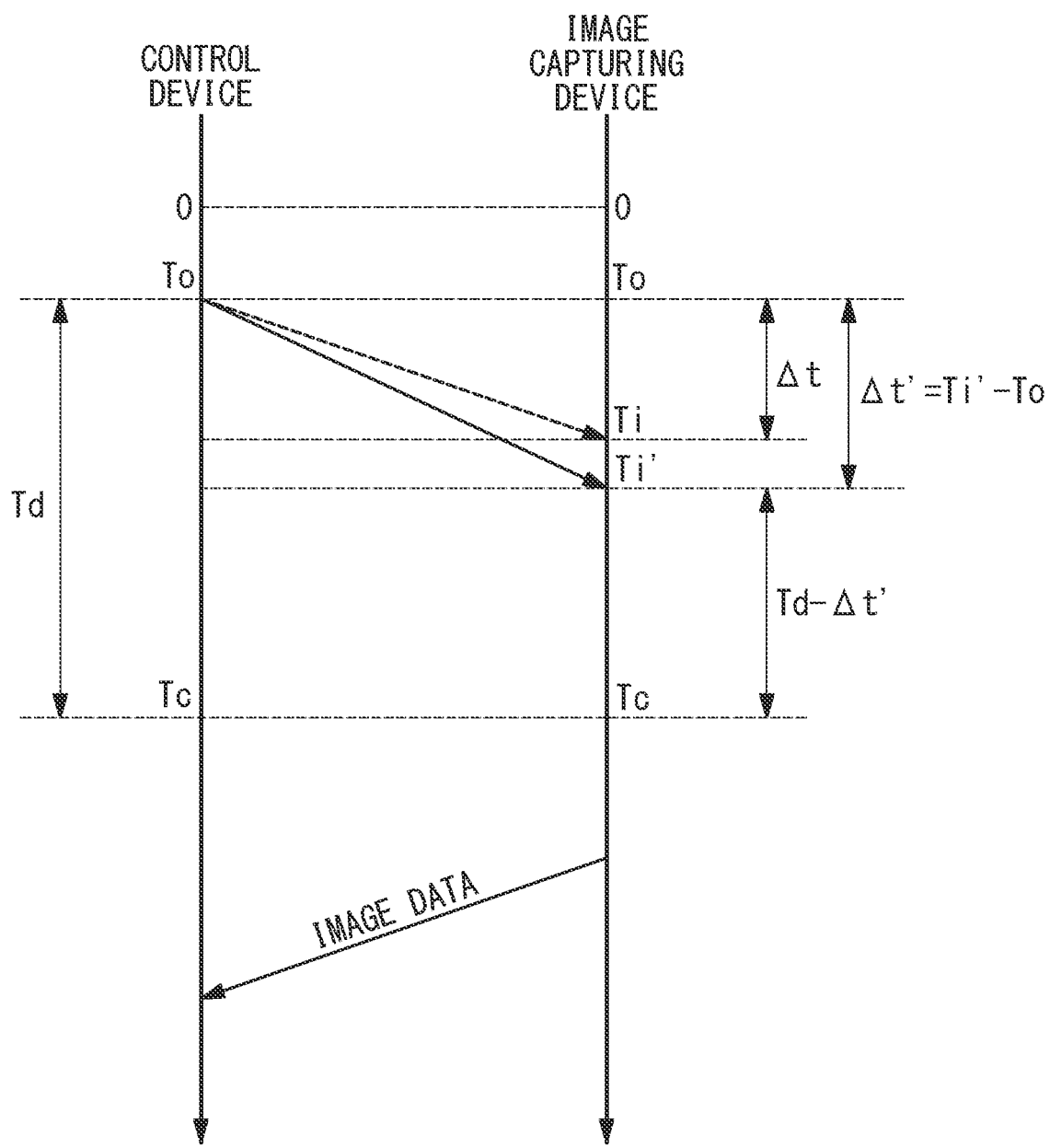
FIG. 4 shows an example data transfer timing between the image capturing device and the control device provided in a first modification of the robot system in FIG. 1.

As shown in FIG. 4, when the second communication unit 32 in the image capturing device 30 receives an image-capturing instruction including the waiting time Td and the transmission time To, the second clock unit 31 obtains the receiving time Ti' of the image-capturing instruction.

Then, the calculation unit 35 calculates the actual difference time Δt' by subtracting the transmission time To from the receiving time Ti', thus making it possible to accurately calculate the image capturing time Tc. As a result, it is possible to capture an image of the workpiece W at the accurately calculated image capturing time Tc and to accurately obtain the position information of the robot 20 at the image capturing time Tc.

Figure 5:
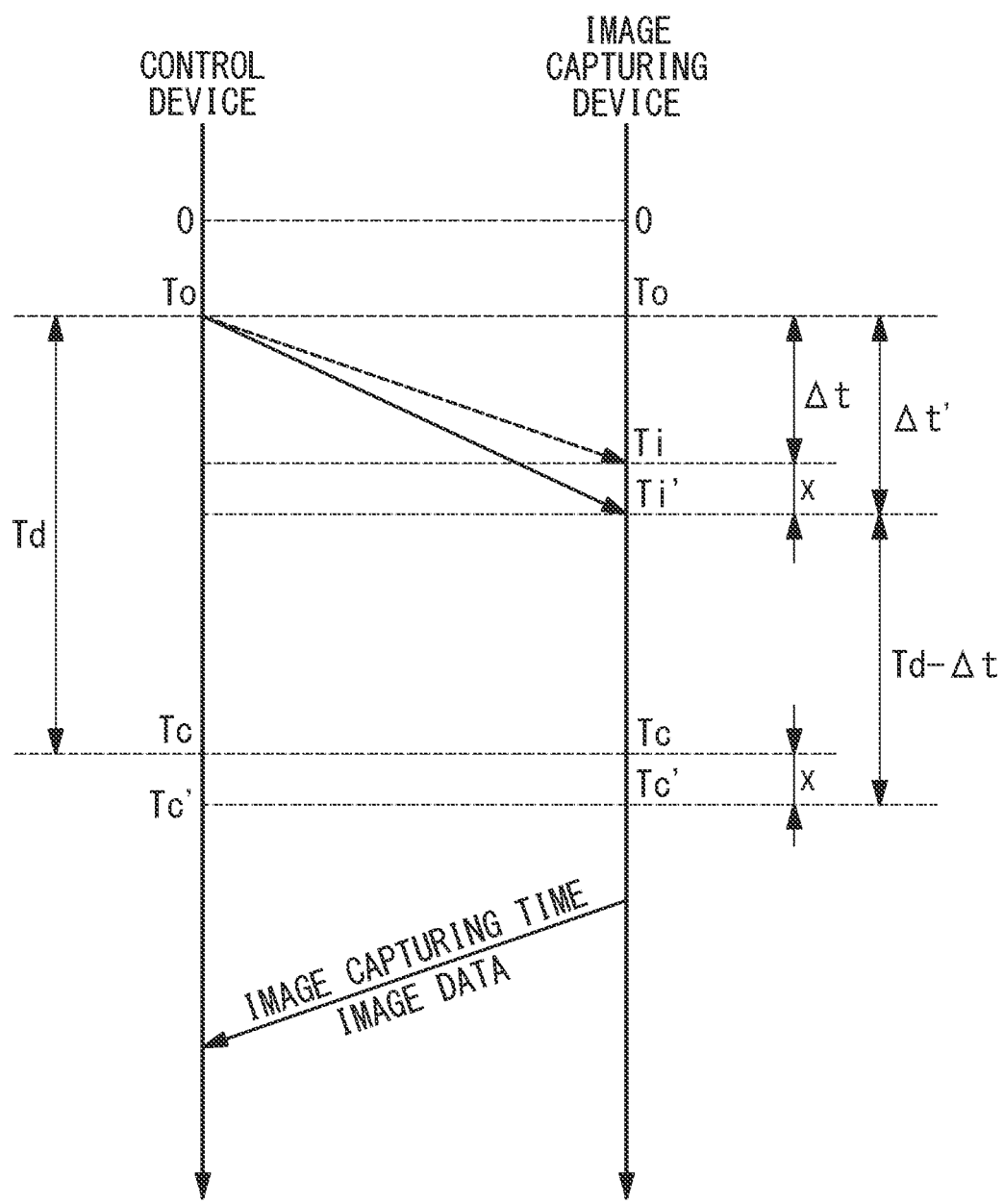
FIG. 5 shows an example data transfer timing between the image capturing device and the control device provided in a second modification of the robot system in FIG. 1.

In this embodiment, as shown in FIG. 5, the image capturing device 30 may transmit the actual image capturing time Tc' to the control device 40. The control device 40 may correct the waiting time Td to be added to the next image-capturing instruction using the received actual image capturing time Tc' and the time Tc, at which the position information of the robot 20 was obtained.

More specifically, when the control device 40 receives the actual image capturing time Tc' from the image capturing device 30, the control device 40 calculates a time lag (difference) x between the received image capturing time Tc' and the time Tc, at which the control device 40 obtained the position information of the robot 20. Then, the control device 40 calculates the waiting time Td' in which the time lag x has been corrected, using the expression below:

$$Td' = Td + x,$$

where Td' is the waiting time after the correction.

Furthermore, the image capturing device 30 subtracts the difference time Δt stored in the second storage unit 34 from the corrected waiting time Td' included in the image-capturing instruction. By doing so, in the next image capturing, an image of the workpiece W can be captured at the correct image capturing time Tc', in which the time lag x has been corrected.

The correction of the waiting time Td may be performed by using either the most-recent prior image capturing time Tc' alone or an average time of previously obtained multiple image capturing times Tc'. When changes of the actual difference time Δt' are mild, the former correcting method is effective, and when the actual difference time Δt' varies each time, the latter correcting method is effective.

Furthermore, in this embodiment, the control device 40 may correct the required time T to be added to the next image-capturing instruction on the basis of the actual image capturing time Tc' received from the image capturing device 30.

In that case, the control device 40 calculates the time lag x between the actual image capturing time Tc' received from the image capturing device 30 and the time Tc, at which the position information of the robot 20 was obtained. Then, the control device 40 calculates the difference time Δt', in which the time lag x has been corrected, from the time lag x and the difference time Δt stored in the first storage unit 43.

Thereafter, the control device 40 corrects the required time T by the time lag x by subtracting the corrected difference time Δt' from the waiting time Td stored in the first storage unit 43.

By doing so, in the next image capturing, an image of the workpiece W can be captured at the correct image capturing time Tc', in which the time lag x has been corrected.

The correction of the required time T may be performed by using either the most-recent prior image capturing time Tc' alone or the average time of previously obtained multiple image capturing times Tc'. When changes of the actual difference time Δt' are mild, the former correcting method is effective, and when the actual difference time Δt' varies each time, the latter correcting method is effective.

In another aspect, the control device 40 may add the image capturing time Tc to the image-capturing instruction to be transmitted to the image capturing device 30.

In that case, in the image capturing device 30, when the second communication unit 32 receives an image-capturing instruction from the control device 40, the camera 33 captures an image of the workpiece W at the time when the second clock unit 31 has clocked the image capturing time Tc.

Meanwhile, in the control device 40, when the first clock unit 41 clocks the image capturing time Tc, the position information of the robot 20 is obtained and stored in the first storage unit 43.

This way, the image capturing device 30 and the control device 40 perform image capturing of the workpiece W and acquisition of the position information of the robot 20 at the same image capturing time Tc.

In other words, there is an advantage in that it is possible to perform image capturing of the workpiece W with the image capturing device 30 and acquisition of the position information of the robot 20 with the control device 40 at the same time, without the influence of the difference time Δt occurring in the transfer of the image-capturing instruction.

Furthermore, although the first clock unit 41 and the second clock unit 31 have the same zero points in this embodiment, the zero point of the first clock unit 41 and the zero point of the second clock unit 31 may differ by a known amount.

In that case, the image capturing device 30 needs to increase or decrease the waiting time Td or the required time T by the time corresponding to the time lag.

Although a vertical six-axis articulated-type robot has been described as an example in this embodiment, the robot is not limited thereto, and the present invention may also be applied to any other types of robots, such as horizontal articulated robots and parallel-link robots.

The invention claimed is:

1. A robot system, comprising:
   a robot that performs work on a workpiece;
   a camera that captures an image of the workpiece while the workpiece is being moved relative to the camera; and
   a controller that controls the camera and the robot, wherein
   the controller and the camera have clocks whose zero points are the same or shifted from each other by a known amount,
   the controller is configured to obtain position information of the robot corresponding to an image-capturing instruction when a waiting time elapses from a sending time that the image-capturing instruction is sent to the camera,
   the controller is configured to conduct transmission of, to the camera, the image-capturing instruction including a required time obtained by subtracting, from the waiting time, a transfer time which is necessary time for transfer of the image-capturing instruction from the controller to the camera, or the controller is configured to conduct transmission of, to the camera, the image-capturing instruction including the waiting time obtained by adding the transfer time to the required time,
   the camera is configured to conduct image capturing of an image of the workpiece at time when the required time elapses from time that the camera receives the image-capturing instructions, and transmits, to the controller, image data obtained by the image capturing, and the controller is configured to control the robot based on the position information and the image data transmitted from the camera.

2. The robot system according to claim 1, wherein the camera transmits an image capturing time corresponding to the image data to the controller, and the controller corrects the waiting time or the required time to used in a next image-capturing instruction based on a difference between the image capturing time transmitted from the camera and a time after elapse of the waiting time from the sending time.

3. A robot system, comprising:

a robot that performs work on a workpiece;

an camera that captures an image of the workpiece while the workpiece is being moved relative to the camera; and a controller that controls the camera and the robot, wherein the controller and the camera have clocks whose zero points are the same or shifted from each other by a known amount, the controller is configured to obtain position information of the robot corresponding to an image-capturing instruction when a waiting time elapses from a sending time that the image-capturing instruction is sent to the camera, the controller is configured to conduct transmission of, to the camera, of an image-capturing instruction including the waiting time and a sending time of the image-capturing instruction, the camera is configured to conduct image capturing of an image of the workpiece at a time when a required time elapses from receiving time of the image-capturing instruction, the required time being a time obtained by subtracting, from the waiting times, a difference time between the sending time and the receiving time of the image-capturing instruction which includes the sending time of the transmission, and transmits, to the controller, image data obtained by the image capturing, and the controller is configured to control the robot based on the position information and the image data transmitted from the camera.

\* \* \* \* \*